May 15, 1923.                    1,455,568
M. BRUNET
GOVERNOR FOR STEAM ENGINES
Filed Aug. 17, 1921           2 Sheets-Sheet 2
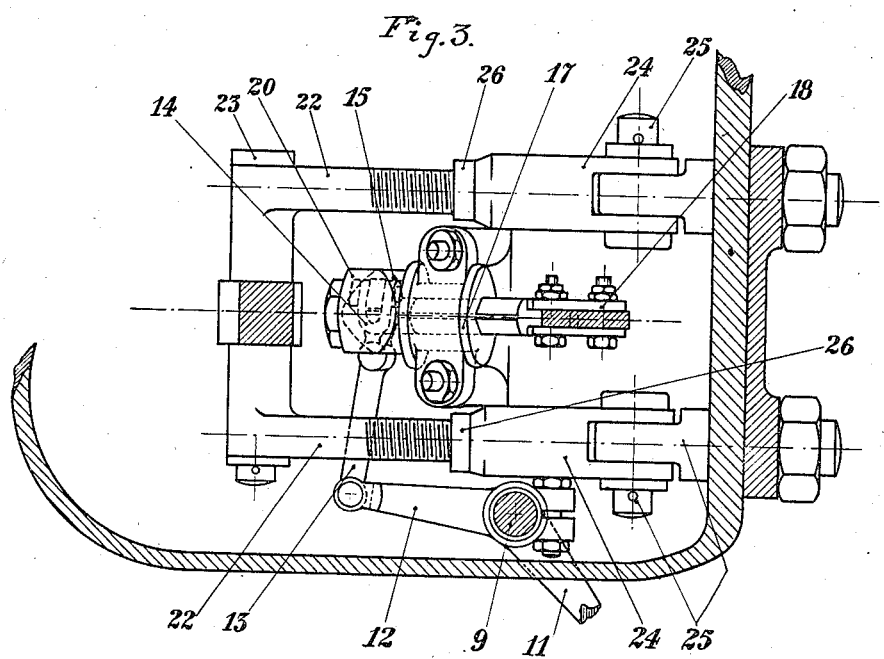
Inventor:
Maurice Brunet.
per
Attorney.

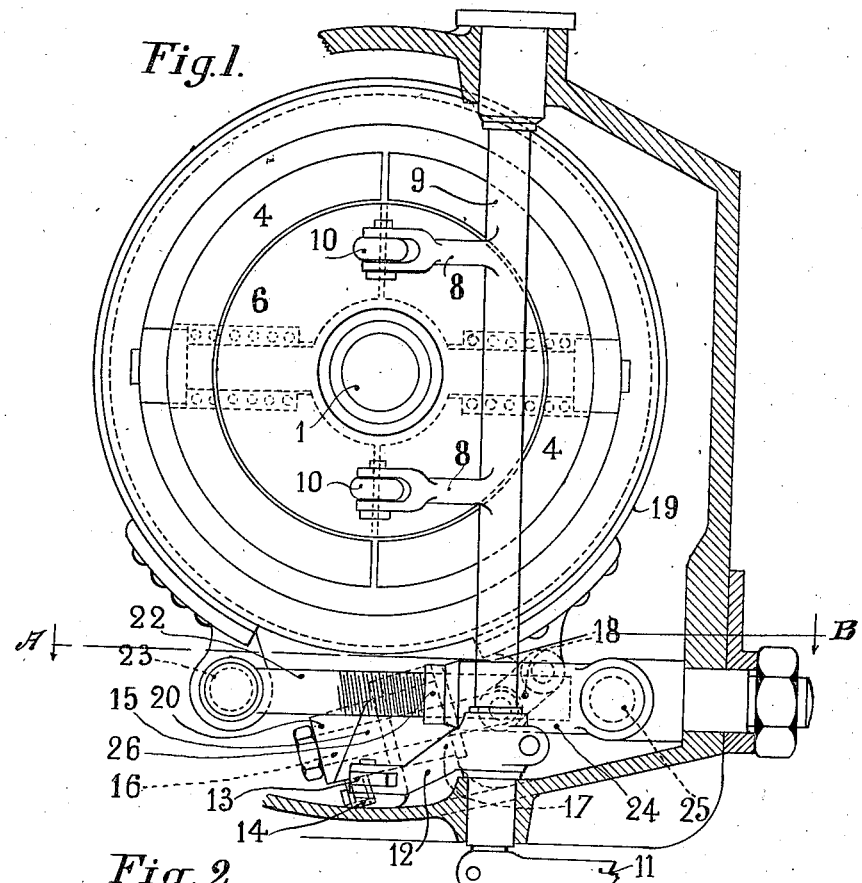
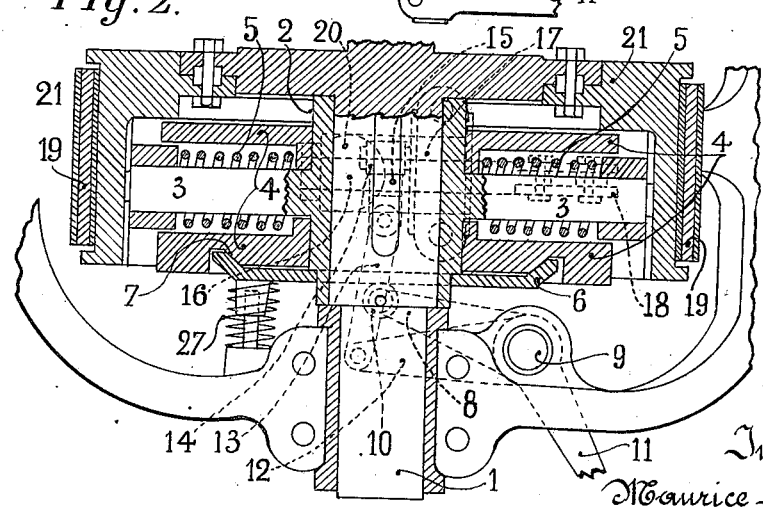

Patented May 15, 1923.

1,455,568

UNITED STATES PATENT OFFICE.

MAURICE BRUNET, OF LIEGE, BELGIUM, ASSIGNOR TO MAISON DETILLEUX, SOCIÉTÉ ANONYME, OF LIEGE, BELGIUM.

GOVERNOR FOR STEAM ENGINES.

Application filed August 17, 1921. Serial No. 493,107.

(GRANTED UNDER THE PROVISIONS OF THE ACT OF MARCH 3, 1921, 41 STAT. L., 1313.)

*To all whom it may concern:*

Be it known that I, MAURICE BRUNET, a citizen of the French Republic, residing at Liege, Belgium, 84 rue Sur-La-Fontaine, have invented certain new and useful Improvements in Governors for Steam Engines, for which I have filed applications in France, March 2d, 1920, Patent No. 511017; in Italy, April 30th, 1921, application No. 302/1642; England, April 22d, 1921, Patent No. 178,331; Germany, March 24th, 1921, application No. 55962; and in Belgium March 22d, 1921, Patent No. 295 316; and of which the following is a specification.

The present invention relates to improvements in governors for steam engines, and has more particularly for its object to provide an improved governor, mounted on the crank-shaft, of the type which acts automatically, under the effect of centrifugal force, not only on the admission of steam in the cylinder or cylinders, but also, through the medium of a suitable band-brake, on the crank-shaft itself.

The automatic governor forming the subject matter of the present invention mainly comprises a hub keyed on the crank-shaft and provided with two radial arms on which are mounted so as to be able to slide radially, two jaws which tend to move away from the shaft under the action of centrifugal force and against the action of suitable springs, and one of the faces of which is provided with a circular groove of suitable section to engage against the inclined edge of a circular crown in such a way that, when the jaws tend to move away from the shaft, they cause a motion of the said crown in the direction of the longitudinal axis of the said shaft, the said crown acting in this manner on rollers forming the ends of arms solid with a rod which, through the medium of suitable organs, controls the admission of steam and the operation of a band-brake acting on the crank-shaft.

The accompanying drawing shows, by way of example only, an embodiment of a governor according to the present invention, Fig. 1 being a side view showing the said governor applied to a steam engine of the compound type, Fig. 2 being a corresponding horizontal section, and Fig. 3 being a sectional elevation on the line A—B of Fig. 1.

As may be seen from the drawings, on the crank-shaft 1 is keyed a hub 2, bearing two radial arms 3 on which are mounted so as to be able to slide radially two jaws 4, of which the faces are circular but the transverse section is U-shaped. These jaws tend to move away from the shaft 1 and to compress the return springs 5 under the action of centrifugal force. Through this automatic motion, a crown 6 having a circular edge inclined in relation to the longitudinal axis of the shaft 1 and adapted to engage against the correspondingly inclined part of a circular groove of suitable section provided on one of the faces of each jaw 4, is forced, owing to the relative motion of the said inclined parts, to move in the direction of the longitudinal axis of the shaft 1, and in this way acts on arms 8 solid with a rod 9 and provided with rollers 10 allowing their ends to bear against the crown 6.

The rod 9 in its turn controls, by means of the crank 11, the admission of steam in the cylinder of the engine. Moreover this rod is provided with a crank 12 which is pivotally secured to one end of a link 13 having its other end connected pivotally to a bracket 14 cast on a cam 15 adapted to rotate on a bar 16 when the crank 12 is operated by the rod 9. The said bar 16 is at one of its ends connected by a link 18 to one end of a band-brake 19 and is maintained in the required position by means of a sleeve-bearing 17 cast on the body of the engine and in which the bar 16 is able to slide. One of the ends of the cam 15 is inclined in relation to the longitudinal axis of the bar 16 and engages with the adjacent end of a cam 20 keyed on the end of the bar 16 opposed to that which is connected to the end of the band-brake 19. The rotation of the cam 15 thus forces the cam 20 to move away from the sleeve-bearing 17 in the direction of the longitudinal axis of the bar 16, which results in a traction being exerted on the end of the band-brake, and therefore causes the application of the band of the said brake on a drum 21 rigidly secured on the hub 2.

The other end of the brake 19 is connected by means of a pivot 23 to a threaded rod having its threaded portion screwed in a sleeve 24 pivotally secured in 25, the said screwed rod being indicated on the drawings by 22. This arrangement enables any adjustment required to compensate the wear of the brake to be effected readily; a lock-nut 26 is provided to keep rod 22 screwed tight in the sleeve 24. A spring 27 arranged between the crown 6 and the body of the engine tends to keep the said crown in the normal position which it occupies when the engine is not running. This spring, as may be seen from Fig. 2, is coiled round a pin fixed to the engine casing and engaging a corresponding female boss of the crown 6, so that the latter, although able to slide along the hub 2, is not able to rotate with the jaws 4.

It must be understood that the details of execution and the relative positions of the various organs constituting the present invention may be modified without departing from the principle or the scope of the said invention.

I am aware that prior to my present invention governors for engines have been constructed which were based on the general combination of a centrifugally controlled element for actuating both a brake and a throttle; I therefore do not claim such a combination broadly; but—

I claim:

1. In a governor for steam engines, of the type wherein a centrifugally operated band-brake acts directly on the crank-shaft, said brake having one end of the brake band adjustably secured to the engine casing, a bar slidably mounted in a bearing of the engine casing, and having at one end a link connection with the other end of the brake-band, a cylindrical fixed cam and a cylindrical rotatable cam mounted end to end on said bar between a nut on the other end thereof and the aforesaid bearing and having their contacting surfaces in a plane passing diagonally through the longitudinal axis of such bar, a brake-operating rod rotatably mounted in bearings of the engine casing at right angles to the crankshaft, and an operative crank and pivoted link connection between said rod and the aforesaid rotatable cam, in combination with: a hub keyed on the crank-shaft and having a pair of radial arms, a pair of opposed semi-circular jaws slidably mounted on said arms, compression springs between the free ends of said arms and the jaws, exerting a radial pressure towards the hub on said jaws, a circular sloping surface in one side of said jaws, formed by the inner periphery of a circular groove of suitable cross-section, a spring-pressed dish-shaped crown slidably mounted on the aforesaid hub and having an inclined peripheral flange in operative facial engagement with said circular sloping surface, and means for causing the aforesaid brake-operating rod to be rotated by the movement of the said crown along the hub, substantially as described.

2. In a governor for steam-engines, according to claim 1, means for causing the brake-operating rod to be rotated by the movement of the crown along the hub, consisting of a pair of solid radial arms of said rod having their free ends fitted with a roller in operative contact with the outer face of said crown, substantially as described.

3. In a governor for steam engines, according to claim 1, a crank secured on the brake-operating rod and having its free end operatively connected to the valve controlling the admission of steam, substantially as described.

In testimony thereof I have signed hereunto my name in the presence of two subscribing witnesses.

MAURICE BRUNET.

Witnesses:
   CURTIS T. EVERETT,
   A. KOBLER.